US010871423B2

(12) United States Patent
Nolan et al.

(10) Patent No.: US 10,871,423 B2
(45) Date of Patent: Dec. 22, 2020

(54) INTERNET OF THINGS DEVICE FOR MONITORING THE MOTION OF OSCILLATING EQUIPMENT

(71) Applicant: Intel Corporation, Santa Clara, CA (US)

(72) Inventors: Keith Nolan, Mullingar (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 1087 days.

(21) Appl. No.: 15/085,545

(22) Filed: Mar. 30, 2016

(65) Prior Publication Data

US 2017/0284902 A1    Oct. 5, 2017

(51) Int. Cl.
| G01M 99/00 | (2011.01) |
| G08B 21/18 | (2006.01) |
| H04W 4/70 | (2018.01) |
| G08B 5/36 | (2006.01) |
| G08B 3/10 | (2006.01) |
| G08B 25/08 | (2006.01) |

(52) U.S. Cl.
CPC ............ *G01M 99/008* (2013.01); *G08B 3/10* (2013.01); *G08B 5/36* (2013.01); *G08B 21/18* (2013.01); *G08B 25/08* (2013.01); *H04W 4/70* (2018.02)

(58) Field of Classification Search
CPC ...... H04W 4/70; G01M 99/008; G08B 21/18; G08B 25/08; G08B 3/10; G08B 5/36
See application file for complete search history.

(56) References Cited

U.S. PATENT DOCUMENTS

| 5,012,174 | A | * | 4/1991 | Adkins | ................ G01C 19/70 318/649 |
| 5,602,757 | A | * | 2/1997 | Haseley | ................ F04C 28/28 340/635 |
| 5,610,339 | A | * | 3/1997 | Haseley | ................ F04C 28/28 702/56 |
| 5,922,963 | A | * | 7/1999 | Piety | ................ G01M 13/028 702/183 |
| 6,176,682 | B1 | | 1/2001 | Mills | |
| 2007/0277613 | A1 | * | 12/2007 | Iwatsubo | ............ G01M 13/045 73/593 |
| 2010/0247335 | A1 | * | 9/2010 | Atherton | ................ F04D 15/00 417/53 |
| 2012/0020808 | A1 | | 1/2012 | Lawson et al. | |
| 2012/0248078 | A1 | | 10/2012 | Zediker et al. | |

(Continued)

OTHER PUBLICATIONS

PCT International Search Report, PCT Application No. PCT/US2017/017955, date of completion Apr. 20, 2017, 3 pages.

*Primary Examiner* — Roy Y Yi
*Assistant Examiner* — Geoffrey T Evans
(74) *Attorney, Agent, or Firm* — Schwegman Lundberg & Woessner, P.A.

(57) ABSTRACT

A method and apparatus for monitoring the motion of an oscillating mechanical device using one or more internet of things (IoT) devices. An exemplary method for monitoring an oscillating mechanical device includes collecting motion data from an accelerometer attached to a moving part in the oscillating mechanical device. A power spectrum for the oscillating mechanical device is calculated from the motion data. A mask is applied over the power spectrum to determine if a device is having operational difficulties.

21 Claims, 10 Drawing Sheets

(56) References Cited

U.S. PATENT DOCUMENTS

| | | | |
|---|---|---|---|
| 2013/0133410 A1* | 5/2013 | Ueno | F04B 51/00 |
| | | | 73/114.41 |
| 2013/0144489 A1* | 6/2013 | Galasso | B62K 25/286 |
| | | | 701/37 |
| 2016/0041068 A1* | 2/2016 | Wascat | H04W 4/70 |
| | | | 702/39 |
| 2016/0061022 A1 | 3/2016 | McCoy | |
| 2016/0061946 A1 | 3/2016 | Wallace | |
| 2016/0154406 A1* | 6/2016 | Im | G05B 23/0221 |
| | | | 702/188 |
| 2016/0370259 A1* | 12/2016 | Loverich | G01N 29/4472 |
| 2017/0241422 A1* | 8/2017 | Munk | F04D 29/669 |
| 2017/0310345 A1* | 10/2017 | Kitayoshi | H02N 2/18 |

\* cited by examiner

300

INTERNET OF THINGS DEVICE FOR MONITORING THE MOTION OF OSCILLATING EQUIPMENT

TECHNICAL FIELD

The present techniques relate generally to Internet of Things (IoT) devices. More specifically the present techniques relate to a device that can monitor pumpjack operations.

BACKGROUND

It has been estimated that the Internet of Things (IoT) may bring connectivity to 50 billion devices by 2020. The IoT devices may be used for any number of applications, including monitoring other devices to enhance operational efficiency. For example, mechanical devices are often used in field applications. These mechanical devices may be difficult to monitor due to large numbers or remote locations.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
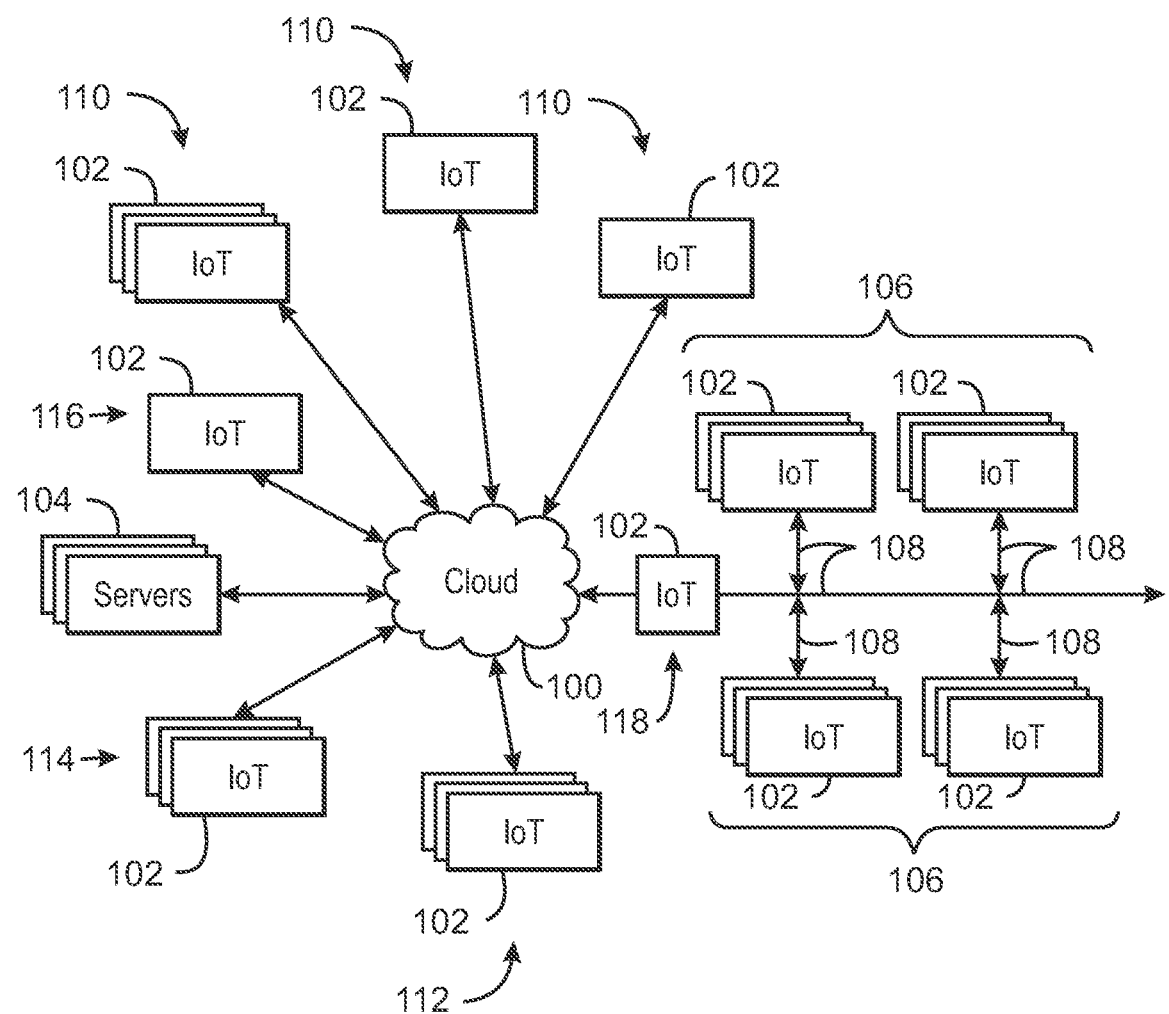
FIG. 1A is a drawing of a cloud computing network, or cloud, in communication with a number of Internet of Things (IoT) devices, at least some of which are communicating with servers.

The internet of things (IoT) is a concept in which a large number of computing devices are interconnected to each other and to the Internet to provide functionality and data acquisition at very low levels. For example, IoT networks may include commercial and home automation devices, such as water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. Further, IoT devices may include IoT gateways, data concentrators and aggregators, and routing bridges used to couple other IoT devices to cloud applications.

For example, as described herein, IoT devices may be used to monitor the motion of oscillating mechanical devices in an oil field. An oil field may have many wellheads and pumpjacks in operation, in addition to other oscillating mechanical devices. One field in California includes about 14,000 operating pumpjacks spread over 114,000 square kilometers. In many cases, it may not be not feasible to assess the status and operational performance of all the equipment assets without extensive, slow, and costly manual inspection. As used herein, oscillating mechanical equipment includes any systems that have repeating circular or linear motions, such as pumpjacks, windmills, pile drivers, and the like.

The techniques described herein may enables users to perform in-situ analysis of the performance and status of oscillating mechanical devices. In many cases, the performance of the devices cannot be ascertained without manual inspection, or by infrequent analysis using dynamometers or other temporary test equipment e.g. once per day. In some cases, a pumpjack card, or similar device, may be used to map the rotational movement of the crank and counterweight, but these require post-processing to convert the manual trace obtained to an electronic form.

The IoT systems described herein use a wireless accelerometer to convert the rotational movement of the pumpjack, such as the counterweight, to Cartesian coordinate data points. The data may be conveyed to a backend system for processing, or processed by the IoT endpoint or processing entity at the network edge that collects the data. The IoT systems may perform frequency analysis of the Cartesian coordinate data, for example, to determine the pumping rate of pumpjacks, upstroke loading, downstroke loadings, variation of pumping rates across entire oil fields, and identification of idle pumpjacks. The system can be retro-fitted on legacy pumpjacks without requiring mechanical modification or pump downtime. The techniques include a method to alert infrastructure operators and managers when pump rates breach nominal thresholds. The output can be represented visually to provide extraction companies with an immediate visual health check of the oscillating mechanical devices.

FIG. 1A is a drawing of a cloud computing network, or cloud 100, in communication with a number of Internet of Things (IoT) devices 102, at least some of which are communicating with servers 104. The cloud 100 may represent the Internet, or may be a wide area network, such as a proprietary network for a company. The IoT devices 102 may include any number of different types of devices, grouped in various combinations. For example, an oil field group 106 may include IoT devices 102 mounted to pumpjacks across an oil field. These IoT devices may include accelerometers, flow devices, and the like. The oil field group 106, or other subgroups, may be in communication with the cloud 100 through a sub-network 108, such as a local area network, wireless local area network, and the like. The IoT devices 102 may use another IoT device 102 as a backend processing system 118 to analyze oscillation data and communicate with the cloud 100. The servers 104 may include process control computers that are used to provide a human machine interface to operators.

Other groups of IoT devices 102 may include remote weather stations 110, local information terminals 112, stand-alone equipment monitoring devices 114, and alarm panels 116, among many others. Each of these IoT devices 102 may be in communication with other IoT devices 102, with servers 104, or both.

As described in further detail herein, the IoT devices 102 may measure the motion of oscillating mechanical devices, and report the measurements to the backend processing system 118 for analysis, such as frequency and power spectrum analysis as described herein. The frequency and power spectrum analysis may be used to determine the operational condition of mechanical devices being monitored by the IoT devices 102. The results may be used to generate alerts.

Figure 1B:
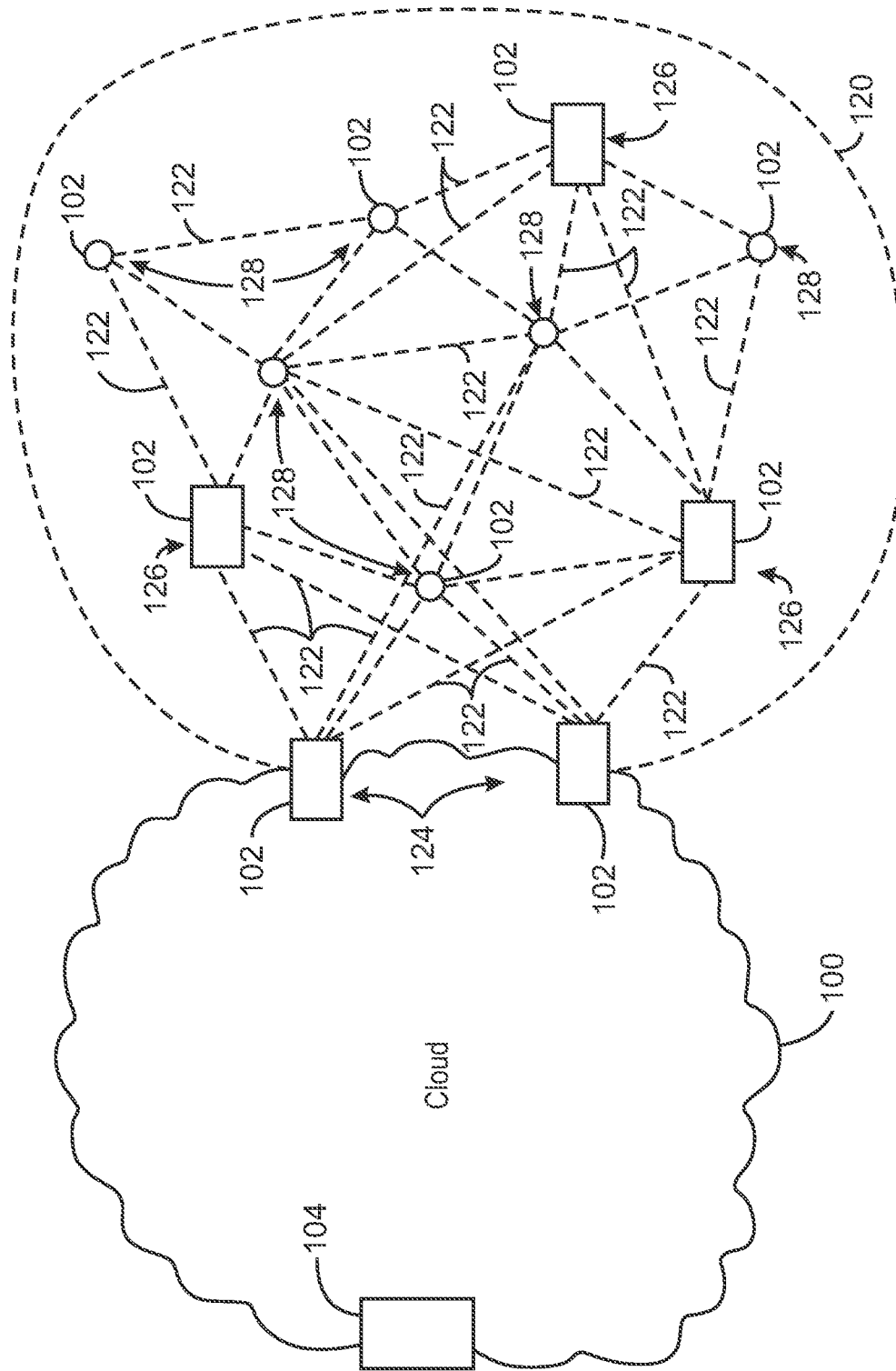
FIG. 1B is a drawing of a cloud computing network, or cloud, in communication with a mesh network of IoT devices, that may be termed a fog, operating at the edge of the cloud.

FIG. 1B is a drawing of a cloud computing network, or cloud 100, in communication with a mesh network of IoT devices 102, that may be termed a fog 120, operating at the edge of the cloud 100. To simplify the diagram, not every IoT device 102 is labeled.

The fog 120 may be considered to be a massively interconnected network wherein a number of IoT devices 102 are in communications with each other, for example, by radio links 122. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.-.M.A.N.), among others.

Three types of IoT devices 102 are shown in this example, gateways 124, data aggregators 126, and sensors 128, although any combinations of IoT devices 102 and functionality may be used. The gateways 124 may be edge devices that provide communications between the cloud 100 and the fog 120, and may also provide the backend process function for data obtained from sensors 128, such as motion data, flow data, temperature data, and the like. The data aggregators 126 may collect data from any number of the sensors 128, and perform the back end processing function for the analysis. The results, raw data, or both may be passed along to the cloud 100 through the gateways 124. The sensors 128 may be full IoT devices 102, for example, capable of both collecting data and processing the data. In some cases, the sensors 128 may be more limited in functionality, for example, collecting the data and allowing the data aggregators 126 or gateways 124 to process the data.

Communications from any IoT device 102 may be passed along the most convenient path between any of the IoT devices 102 to reach the gateways 124. In these networks, the number of interconnections provide substantial redundancy, allowing communications to be maintained, even with the loss of a number of IoT devices 102. Further, the use of a mesh network may allow IoT devices 102 that are very low power or located at a distance from infrastructure to be used, as the range to connect to another IoT device 102 may be much less than the range to connect to the gateways 124.

The fog 120 of these IoT devices 102 devices may be presented to devices in the cloud 100, such as a server 104, as a single device located at the edge of the cloud 100, e.g., a fog 120 device. In this example, the alerts coming from the fog 120 device may be sent without being identified as coming from a specific IoT device 102 within the fog 120. For example, an alert may indicate that a pumpjack in a field is having operational difficulties and present the relevant data, even though the specific IoT devices 102 that determined the problems are not specifically identified.

In some examples, the IoT devices 102 may be configured using an imperative programming style, e.g., with each IoT device 102 having a specific function and communication partners. However, the IoT devices 102 forming the fog 120 device may be configured in a declarative programming style, allowing the IoT devices 102 to reconfigure their operations and communications, such as to determine needed resources in response to conditions, queries, and device failures. As an example, a query from a user located at a server 104 about the operations of a subset of pumpjacks monitored by the IoT devices 102 may result in the fog 120 device selecting the IoT devices 102, such as particular sensors 128, needed to answer the query. The data from these sensors 128 may then be aggregated and analyzed by any combination of the sensors 128, data aggregators 126, or gateways 124, before being sent on by the fog 120 device to the server 104 to answer the query. In this example, IoT devices 102 in the fog 120 may select the sensors 128 used based on the query, such as adding data from flow sensors or temperature sensors. Further, if some of the IoT devices 102 are not operational, other IoT devices 102 in the fog 120 device may provide analogous data, if available.

Figure 2:
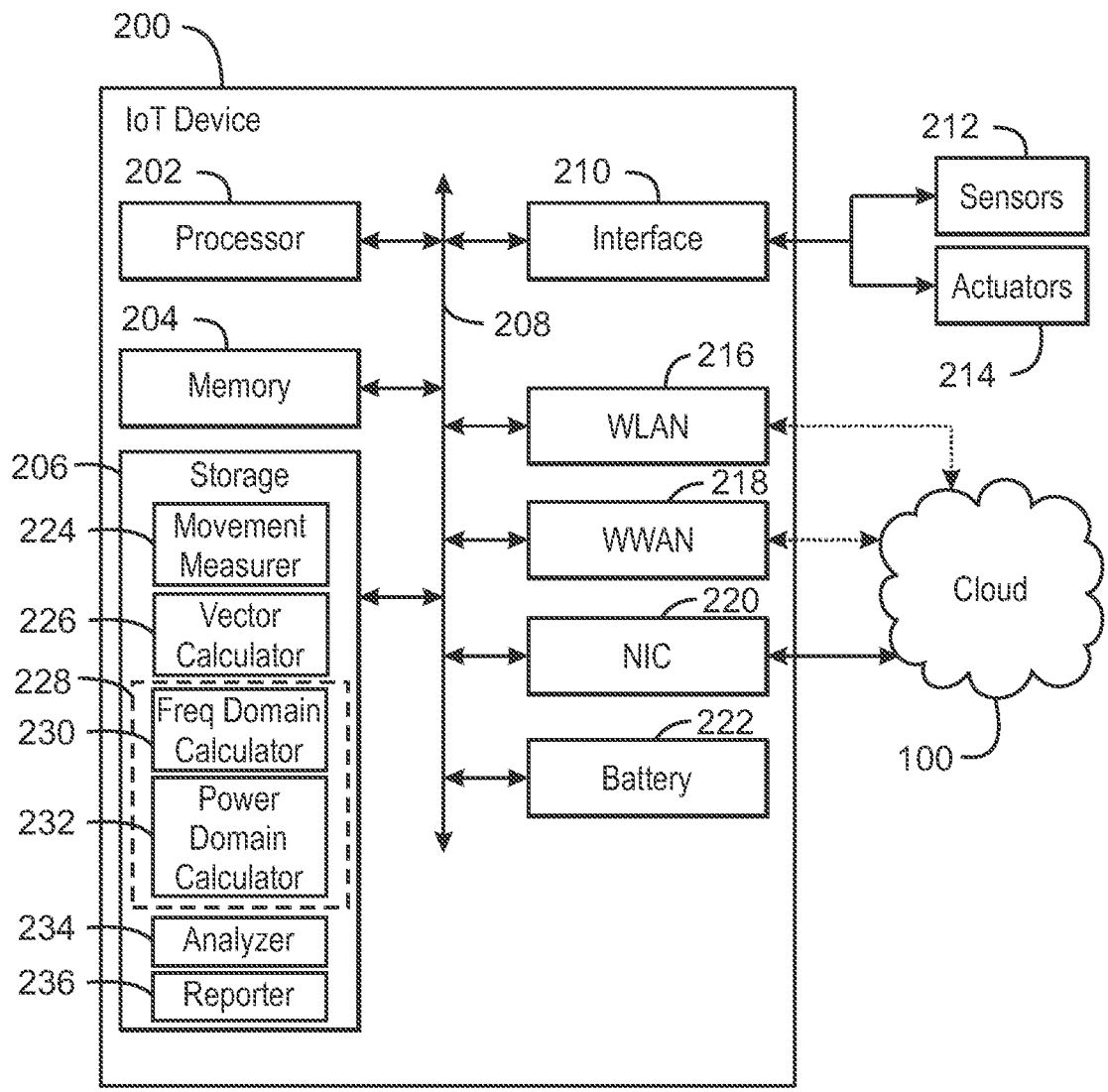
FIG. 2 is a block diagram of components that may be present in an IoT device that may be used as a monitoring device for oscillating equipment.

FIG. 2 is a block diagram of components that may be present in an example IoT device 200 that may be used as a monitoring device for oscillating equipment. Like numbered items are as described with respect to FIG. 1. The example IoT device 200 may include any combinations of the components. The components may be implemented as ICs, portions thereof, discrete electronic devices, or other modules, logic, hardware, software, firmware, or a combination thereof adapted in the example IoT device 200, or as components otherwise incorporated within a chassis of a larger system. The block diagram of FIG. 2 is intended to show a high level view of components of the example IoT device 200. However, some of the components shown may be omitted, additional components may be present, and different arrangement of the components shown may occur in other implementations. The example IoT device 200 may be a monitoring device for an individual oscillating mechanical device, a backend processing system for a group of IoT devices 200 monitoring individual mechanical devices, or a device that performs both functions.

As seen in FIG. 2, the example IoT device 200 may include a processor 202, which may be a microprocessor, a multi-core processor, a multithreaded processor, an ultra-low voltage processor, an embedded processor, or other known processing element. The processor 202 may be a part of a system on a chip (SoC) in which the processor 202 and other components are formed into a single integrated circuit, or a single package. As an example, the processor 202 may include an Intel® Architecture Core™ based processor, such as a Quark™, an Atom™, an i3, an i5, an i7, or MCU-class processors, or another such processor available from Intel® Corporation, Santa Clara, Calif. However, other low power processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an A5/A6 processor from Apple® Inc., a Snapdragon™ processor from Qualcomm® Technologies, Inc., or an OMAP™ processor from Texas Instruments, Inc.

The processor 202 may communicate with a system memory 204. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA). Further, the memory may be integrated into an SoC configuration.

To provide for persistent storage of information such as data, applications, operating systems and so forth, a mass storage 206 may also couple to the processor 202. The mass storage may be integrated into an SoC or may be a separate unit. If separate, to enable a thinner and lighter system design the mass storage may be implemented via a solid state disk drive (SSDD). However, the mass storage may be implemented using a micro hard disk drive (HDD) in some IoT devices 200. Further, any number of new technologies may be used for the mass storage 206 in addition to, or instead of, the technologies described, such resistance change memories, phase change memories, holographic memories, or chemical memories, among others. For example, the example IoT device 200 may incorporate the 3D XPOINT memories from Intel® and Micron®.

The components may communicate over a bus 208. The bus 208 may include any number of technologies, including industry standard architecture (ISA), extended ISA (EISA), peripheral component interconnect (PCI), peripheral component interconnect extended (PCIx), PCI express (PCIe), or any number of other technologies. The bus 208 may be a proprietary bus, for example, used in a SoC based system. Other bus systems may be used, such as the 120 interface, the SPI interface, TIA-485-A, published by the Telecommunications Industry Association/Electronic Industries Alliance (TIA/EIA), Electronic Industries Association (EIA) standard RS-232, and point to point interfaces, among others.

The bus 208 may couple the processor 202 to an interface 210 that is used to connect external devices. The external devices may include sensors 212, such as accelerometers, as described herein. Other sensors may be with the example IoT device 200 in addition to the accelerometers, such as level sensors, flow sensors, temperature sensors, pressure sensors, barometric pressure sensors, and the like. The interface 210 may be used to connect the example IoT device 200 to actuators 214, such as a power switch on an oscillating mechanical device, a valve actuator, or an alert system including an audible sound generator, a visual warning device, and the like.

While not shown, various input/output (I/O) devices may be present within, or connected to, the example IoT device 200. For example, a display may be included to show information, such as sensor readings or actuator position. An input device, such as a touch screen or keypad may be included to accept input.

In some examples, the example IoT device 200 may communicate with a cloud 100 in a variety of manners, including wirelessly. In the embodiment shown in FIG. 2, various wireless modules, each of which can correspond to a radio configured for a particular wireless communication protocol, may be present. As seen in FIG. 2, a WLAN unit 216 may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit 218. The example IoT device 200 is not limited to these types of radio transceivers, but may include any number of other radio communications equipment, such as transceivers compatible with the Bluetooth® standard as defined by the Bluetooth® special interest group, For example, the example IoT device 200 may communicate over a wireless personal area network (WPAN) according to the IEEE 802.15.4 and IEEE 802.15.4g standards, among others. The example IoT device 200 may communicate over a wide area using LoRaWAN (Long Range Wide Area Network) developed by Semtech and the LoRa Alliance, Sigfox, and other ultra-narrow band technologies. These technologies may be used to establish a mesh network between the example IoT device 200 and other devices, as well as the cloud, as discussed with FIG. 1B.

The example IoT device 200 may include a network interface controller 220 to communicate with the cloud 100 or with other IoT devices through an Ethernet interface. This may include communicating through a small wired or wireless network shared by number of IoT devices 200 that communicate with the cloud 100 through a backend processing system 118, as described with respect to FIGS. 1A and 1B.

The example IoT device 200 may be powered by a local power source, such as a battery 222. The local power source may include any number of other units in addition to, or instead of the battery 222, such as solar cells, wind generators, and inductive charging to charge the battery 222, among others. The example IoT device 200 is not limited to battery power. As the device being monitored is generally powered, or generating power, the example IoT device 200 may be power by coupling to that power source. Further, the example IoT device 200 may use the fixed power supply to charge the battery 222, for example, enabling monitoring of the mechanical device during power failures. This may be used to confirm that the mechanical device has lost power and is no longer functional.

The mass storage 206 may include a number of modules to implement the monitoring functions described herein. These modules may include a movement measurer 224 that obtains data from accelerometers, gyroscopes, electrical field sensors, magnetic sensors, time-of-flight (TOF) sensors, or other sensors mounted on the mechanical device or on the mechanical device and a frame, to estimate motion of the oscillating device, for example, to generate the curve described with respect to FIG. 4.

For a rotating device, the movement measurer 224 may track acceleration data from accelerometers in two dimensions, e.g., x and z in the plane of motion of a rotating device, as the oscillating device moves. If the accelerometers are mounted on a crank, as described with respect to FIG. 3, the oscillating device will be accelerating, deaccelerating, or reversing motion to accelerate or deaccelerate in the opposite direction in either of the dimensions. The measurements may not need to be converted into a precise measurement of the location, as the measurement of the acceleration forces will generate a curve that may be used to monitor the device, for example, as described with respect to FIG. 4. If the motion sensor is an accelerometer mounted on an oscillating counterweight, and is rotating with the counterweight, the acceleration measurements with respect to the force of gravity may be used provide the same curve relative illustrating relative motion.

If the oscillating device is moving in a single dimension, such as a piston, the generation of the movement curve becomes easier. As the piston is moving, the accelerometer will be continuously accelerating, deaccelerating, and reversing to repeat this in the opposite direction on each cycle. Thus, the data directly generates the curve described with respect to FIG. 4.

A vector calculator 226 may be included to transform oscillating motions into a vector field. A transform calculator 228 may be included to convert the motion data or vector data from the time domain into the frequency domain and calculate a power spectrum. The transform calculator 228 may include a number of modules, such as a frequency domain calculator 230 to convert vector data into frequency data, and a power spectrum calculator 232 to calculate the power spectrum from the frequency domain data. This may be performed for a group of IoT devices monitoring separate oscillating mechanical devices to generate a single power spectrum plot including results from a number of IoT devices. An analyzer 234 may be included to compare the power spectrum to preset alarm limits to determine if there is a problem with one or more of the oscillating mechanical devices. A reporter 236 may report the results, including, for example, the power spectrum calculation, the alarm determination, and the like. The report 236 may report problems, such as an alarm determination, to local devices as well as to remotely-located monitoring points.

The example IoT device 200 is not limited to the configuration shown in FIG. 2, but may include any number of other configurations. For example, two IoT devices may be used to monitor an oscillating mechanical device as mentioned with respect to FIG. 1. A first example IoT device 200 may include the movement measurer 224 for obtaining motion data from associated accelerometers, and a communications device, such as a radio transceiver, to pass the data on to a second example IoT device 200 functioning as a backend processing system. The backend processing system may collect measurement data from a number of IoT devices 200, and may include the calculation and reporting modules 226, 228, 234, and 236. The backend processing system may then communicate over a network to report the results to a server for display or alarms.

Figure 3:
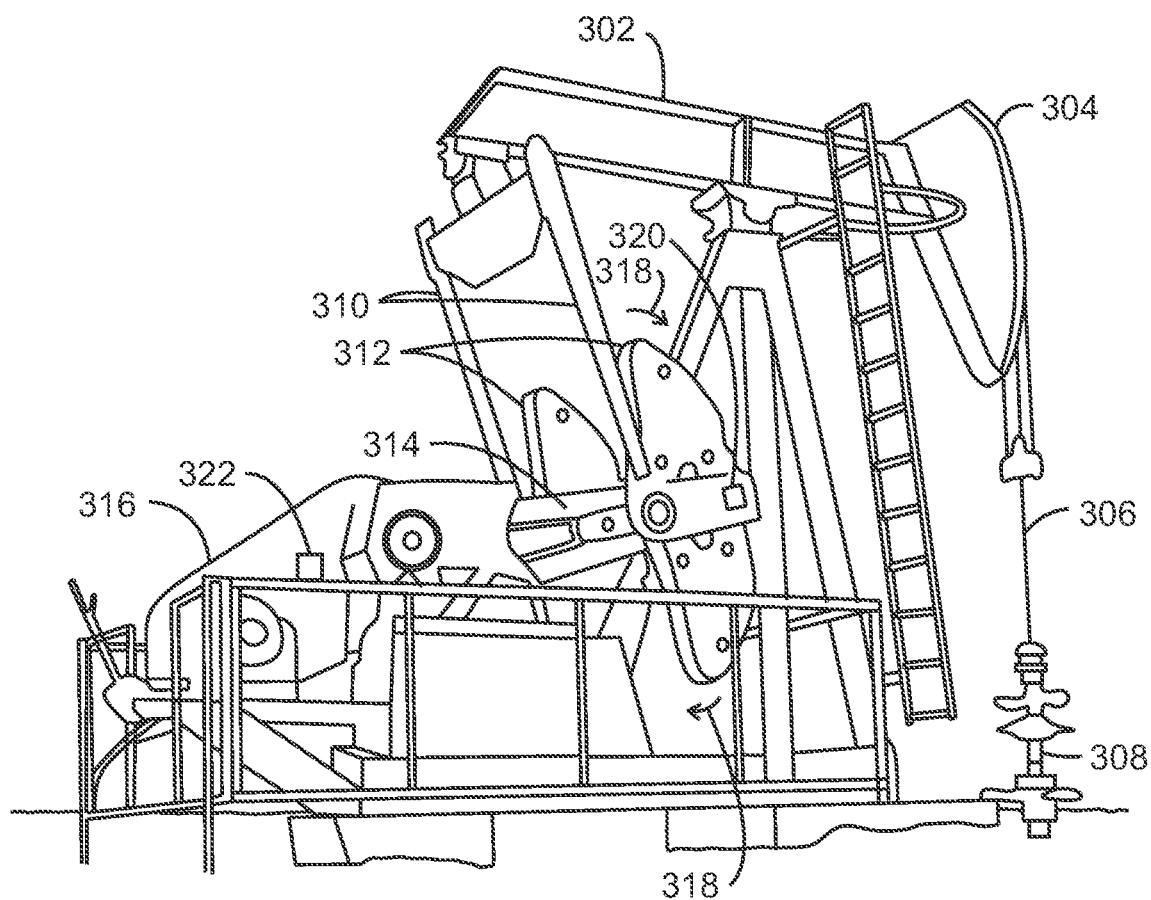
FIG. 3 is a drawing of an example mechanical device that may be monitored by IoT devices.

FIG. 3 is a drawing of an example mechanical device that may be monitored by an IoT device. In this example, the oscillating mechanical device is a pumpjack 300. The components of a pumpjack 300 include a walking beam 302 coupled to a horsehead 304. The horsehead 304 is coupled to a pump shaft 306, which powers a piston type pump located in a well 308.

The opposite end of the walking beam 302 is coupled to a pitman 310 that is coupled to a rotating counterweight 312. The counterweight 312 is turned by a crank 314 that is powered by a motor termed a prime mover 316. As the counterweight 312 rotates, indicated by arrows 318, the walking beam 302 is rocked up and down by the counterweight 312, driving the pump shaft 306 down and up, respectively.

An IoT device 320 may be mounted on the counterweight 312, or on any number of other moving points, such as the crank 314, to track the motions. As discussed with respect to FIG. 2, the IoT device 320 may be a complete device, including both a movement sensor and performing calculations, as described herein. In some examples, the IoT device 320 is a simple movement sensor, such as a wireless accelerometer, sending motion data to another IoT device, such as a separate backend processing system 322. The IoT device 320 may sending out a pulsed radio signal used by a backend processing system 322 to determine location and movement relative to the backend processing system 322, for example, by a time-of-flight determination.

Figure 4:
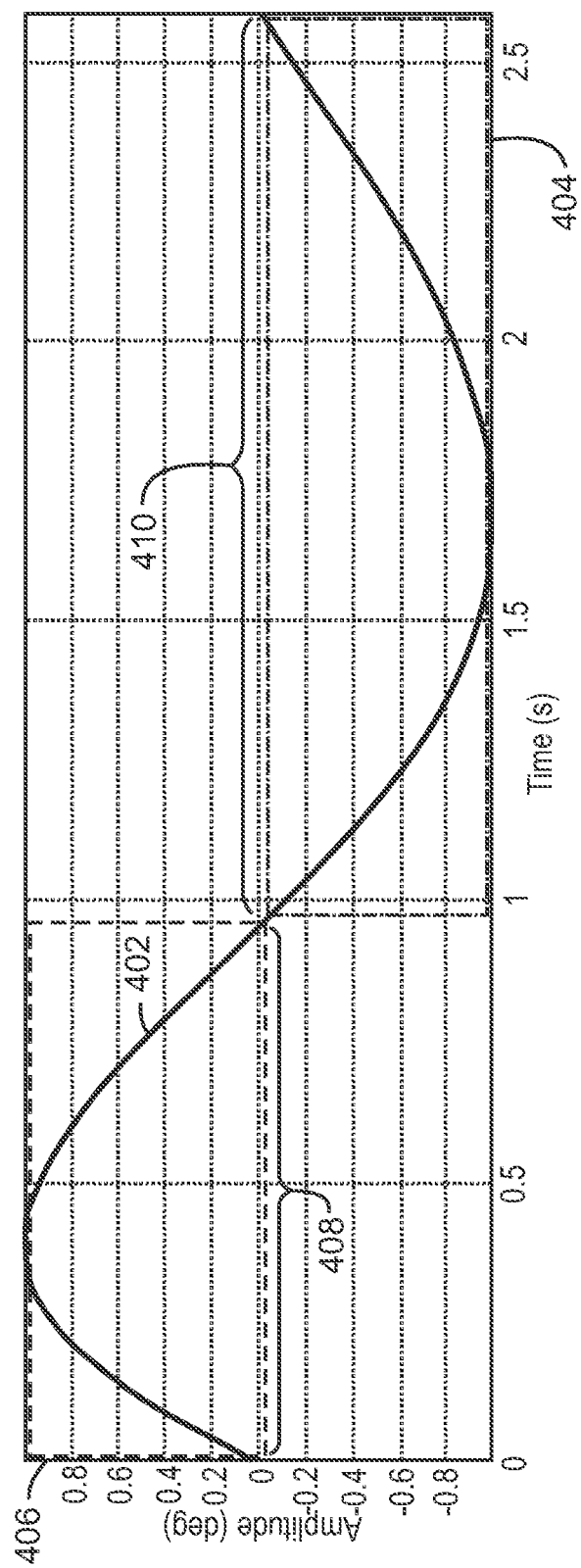
FIG. 4 is a plot of the movement of the example mechanical device of FIG. 3.

FIG. 4 is a plot 400 of the movement of the example mechanical device of FIG. 3. The plot 400 illustrates the movement 402 of an example pumpjack pump cycle as measured via X/Y coordinate data from a rotating pumpjack counterweight. The x-axis 404 represents the time in seconds, while the y-axis 406 represents the amplitude of the motion in degrees. The rotational motion of the counterweight is essentially sine-wave like, as illustrated in the plot 400.

The downstroke 408 occurs when the pump shaft moves downwards as the counterweight moves upwards, recharging the pump in the well with fluid, such as oil or water. Similarly, the upstroke 410 occurs as the counterweight moves downwards, and is the portion of the cycle that lifts the oil or water from the well. Accordingly, the unloaded downstroke 408 moves faster than a loaded upstroke 410 resulting in a longer upstroke time. Due to the difference in speed for the downstroke 408, a frequency change occurs mid-cycle. This results in a modified sine wave. The techniques described herein may also monitor these types of changes.

In addition to loading on the pump, the rotational motion of a pumpjack counterweight is affected by a number of other factors. Deviated wellheads can reduce the pump rate due to lateral movement and increased drag against the wellhead sidewalls. A failure of internal parts or excessive wear in the pump components may result in a similar loading for both the downstroke 408 and the upstroke 410, resulting in a frequency shift.

The sampled rotational motion may be converted to an x, y coordinate, which may then be used to determine in-phase and quadrature waveform (I/Q) vectors. A discrete time Fourier analysis may be used to convert the time-domain I/Q vectors, or other sampled data points, to frequency domain data. The frequency domain data may then be converted to a power spectrum. A spectral mask may be applied to the power spectrum to enable the identification of pumpjack characteristics that breach present conditions, e.g., pumping rate range or frequency faults, among others.

Figure 5:
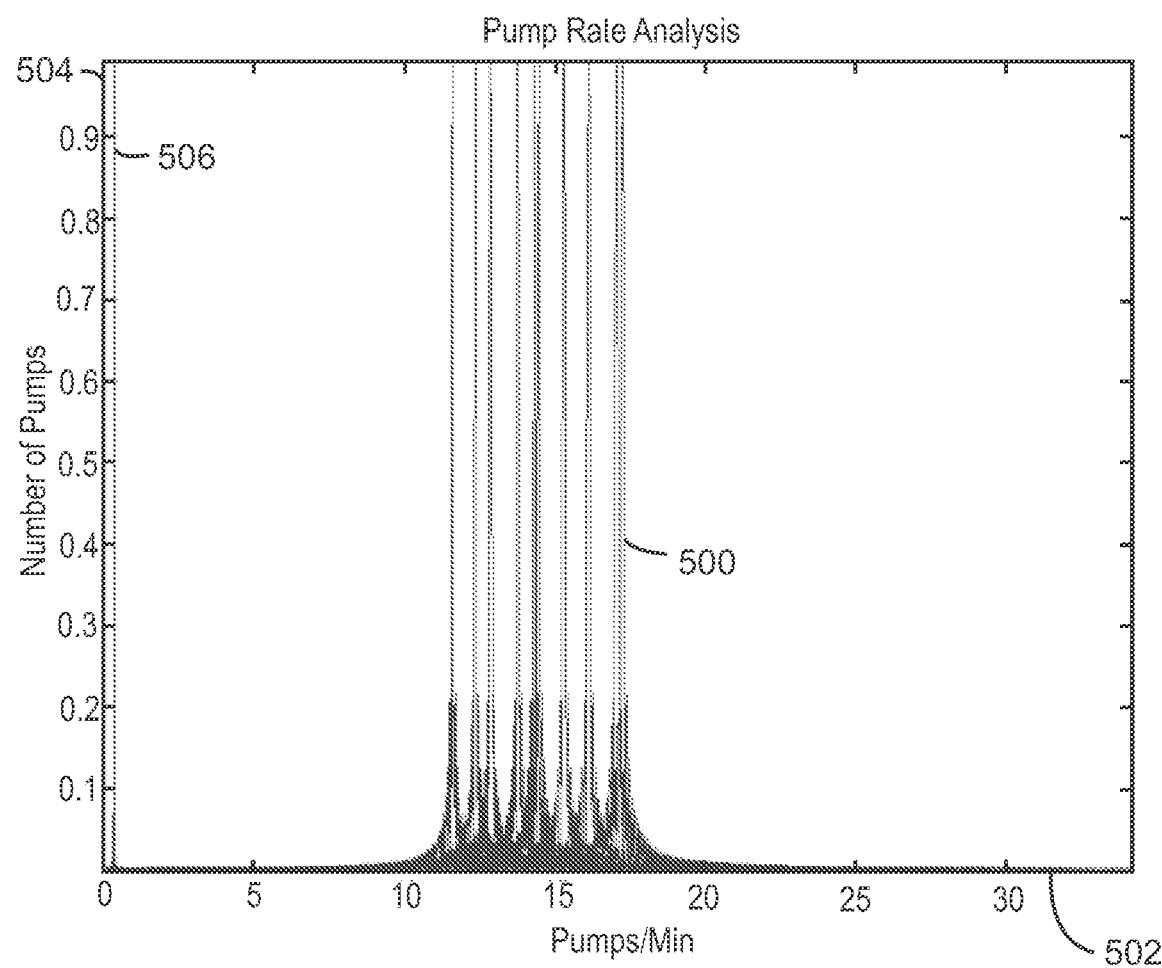
FIG. 5 is a plot of a rate analysis for a group of example mechanical devices, enabling a single plot to identify issues in the group of mechanical devices.

FIG. 5 is a plot 500 of a power spectrum analysis for a group of example mechanical devices, enabling a single plot to identify issues in the group. The x-axis 502 is the frequency of pumping in pumps per minute, while the y-axis 504 is the number of pumps, e.g., the amplitude. The plot 500 illustrates ten pumpjacks operating at pumping rates varying from about 13 to about 17 pumps per minute. The plot also shows a non-functioning pump as a spike 506 in the plot 500 where the pump rate is nearly zero. Essentially, the plot 500 provides a visual assessment method to assess the spread of pumping rates across their sites and to determine if any pumps are not functioning.

Figure 6:
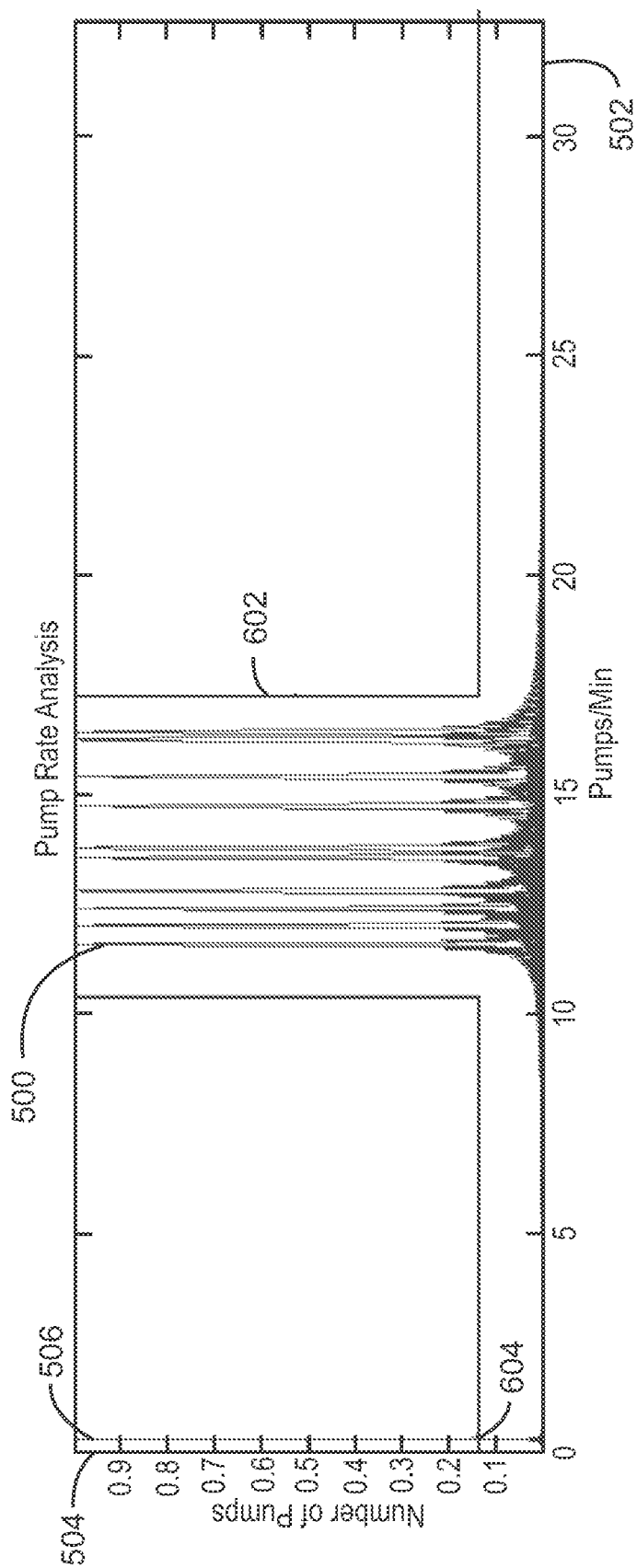
FIG. 6 is a plot of a rate analysis for a group of example mechanical devices, showing the imposition of an alert mask 602 to highlight problems with the functioning of certain of the mechanical devices.

FIG. 6 is a plot 600 of a rate analysis for a group of example mechanical devices, showing the imposition of an alert mask 602 to highlight problems with the functioning of certain of the mechanical devices. Like numbered items are as described with respect to FIG. 5. The overlay mask is shown as a visual template in FIG. 6, but would be understood to be mathematical limits imposed at each point along the plot 500. Any values that exceed those limits would trigger an alarm. In the example of FIG. 6, the non-function pumpjack indicated by spike 506 triggers an alert 604.

Figure 7:
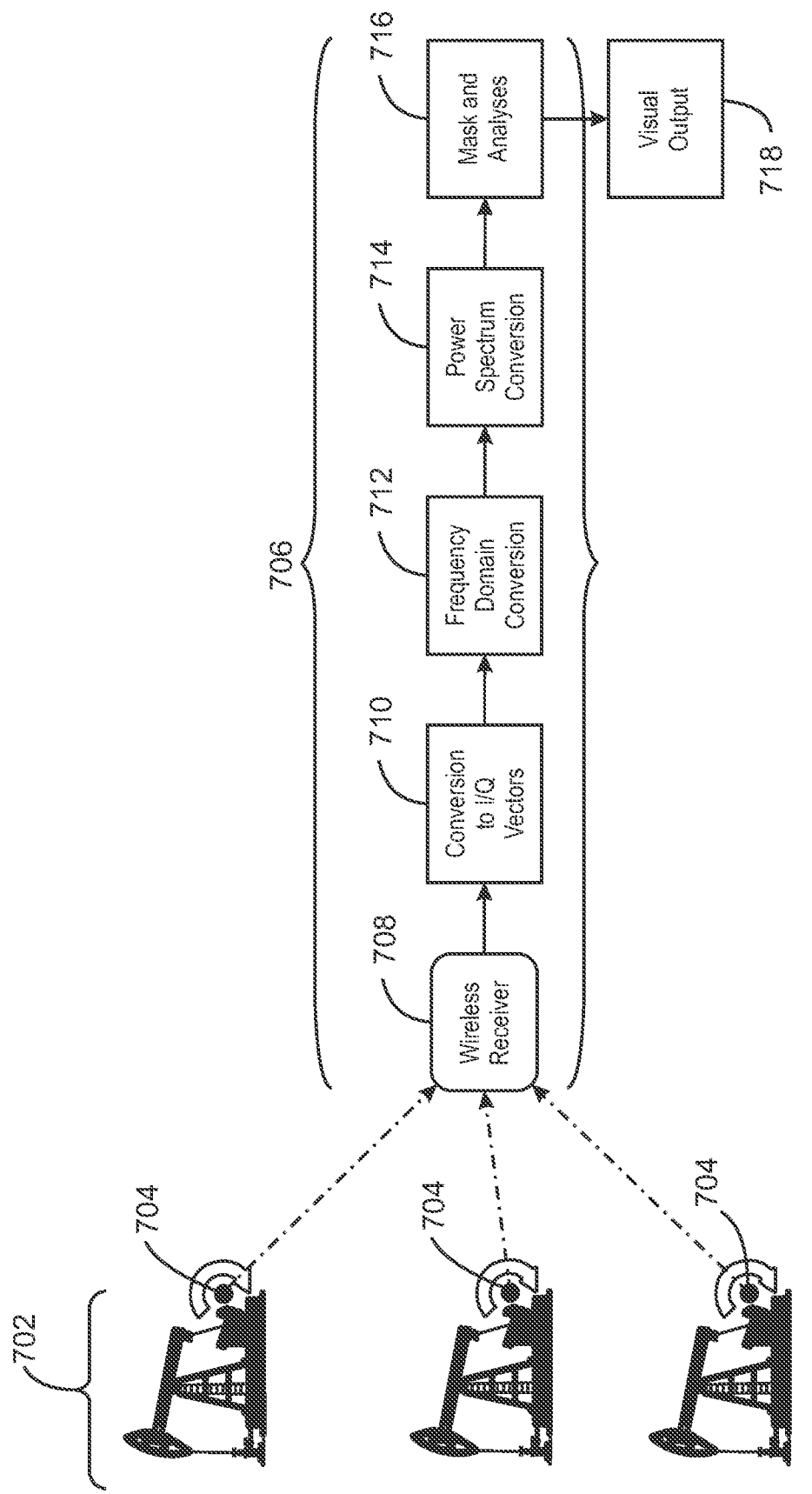
FIG. 7 is a schematic example illustrating the flow of information from pumpjack sensors through to the analysis stage.

FIG. 7 is a schematic example 700 illustrating the flow of information from pumpjack sensors through to the analysis stage. As shown in the schematic example 700, multiple instrumented pumpjacks 702 in a remote oilfield may use IoT devices 704 to obtain movement data, such as the rotation of the counterweights. This can be achieved using accelerometers connected to wireless transceivers where the sensor to transceiver interconnection can be either serial, TIA/RS-485, Bluetooth, Bluetooth Low Power, WiFi, IEEE 802.15.4, LoRa, SigFox, I2C, or SPI. Similarly, the pumpjack IoT devices 704 may communicate with a data processing backend system 706 via wired or wireless means. Examples include Ethernet, TIA/RS-485, optical fibre, LoRa, SigFox, WiFi, IEEE 802.15.4, EC-GSM, LTE, LTE-M and its variants.

In the data processing system, at block 710, the motion data, for example, as shown in FIG. 4, may be processed to convert it to an in-phase and quadrature (I/Q) vector signal data. This involves periodically sampling and re-mapping the Cartesian coordinates, Y, of the counterweight to complex-valued I/Q space to create the pumpjack rotation vector set x according to Eqn. 1.

$$x[n]=Y_{nT} \quad \text{Eqn. 1}$$

In Eqn. 1, T represents the sampling interval.

The vector set, x, may be converted to frequency domain data at block 712. For example, a discrete Fourier transform may convert the time-domain complex valued data to frequency domain data. This may be performed using the formula in Eqn. 2.

$$X_k = \sum_{n=0}^{N-1} x[n]e^{-i2\pi\frac{kn}{N}}, k = 0, 1, \ldots, N-1 \quad \text{Eqn. 2}$$

In Eqn. 2, x[n] is a finite-length sequence of complex valued pumpjack rotation vectors, L is the length of the sample window or number of samples in x, N is the number of fast Fourier transform bins, and where L≤N.

At block 714, a power spectrum, for example, as illustrated in the example plot of FIG. 5, is produced. This is performed by converting the complex-valued frequency domain data to the power spectrum by determining the absolute value of the frequency domain data using the formula in Eqn. 3.

$$S_k=|X_k| \quad \text{Eqn. 3}$$

A mask can be applied in at block 716, for example, as illustrated in FIG. 6, to assess if the observed pumpjack performance characteristics as determined by the output of Eqn. 3, breach any of the mask conditions. In the example of FIG. 6, this indicates that one of the pumpjacks is not active.

At block 718, the output of the system can be represented visually, for example, on monitors local to the field or on monitors in an operations control room. Further, the output may include alert messages if one or more of the configurable mask limits have been breached.

The technique may be used to produce a dynamic performance profile of an entire set of connected pumpjacks. In an example case, one of the key outputs from this system is that the pumpjack pumping rates and variations can be represented without requiring individual pumpjack inspection and manual labor.

Figure 8:
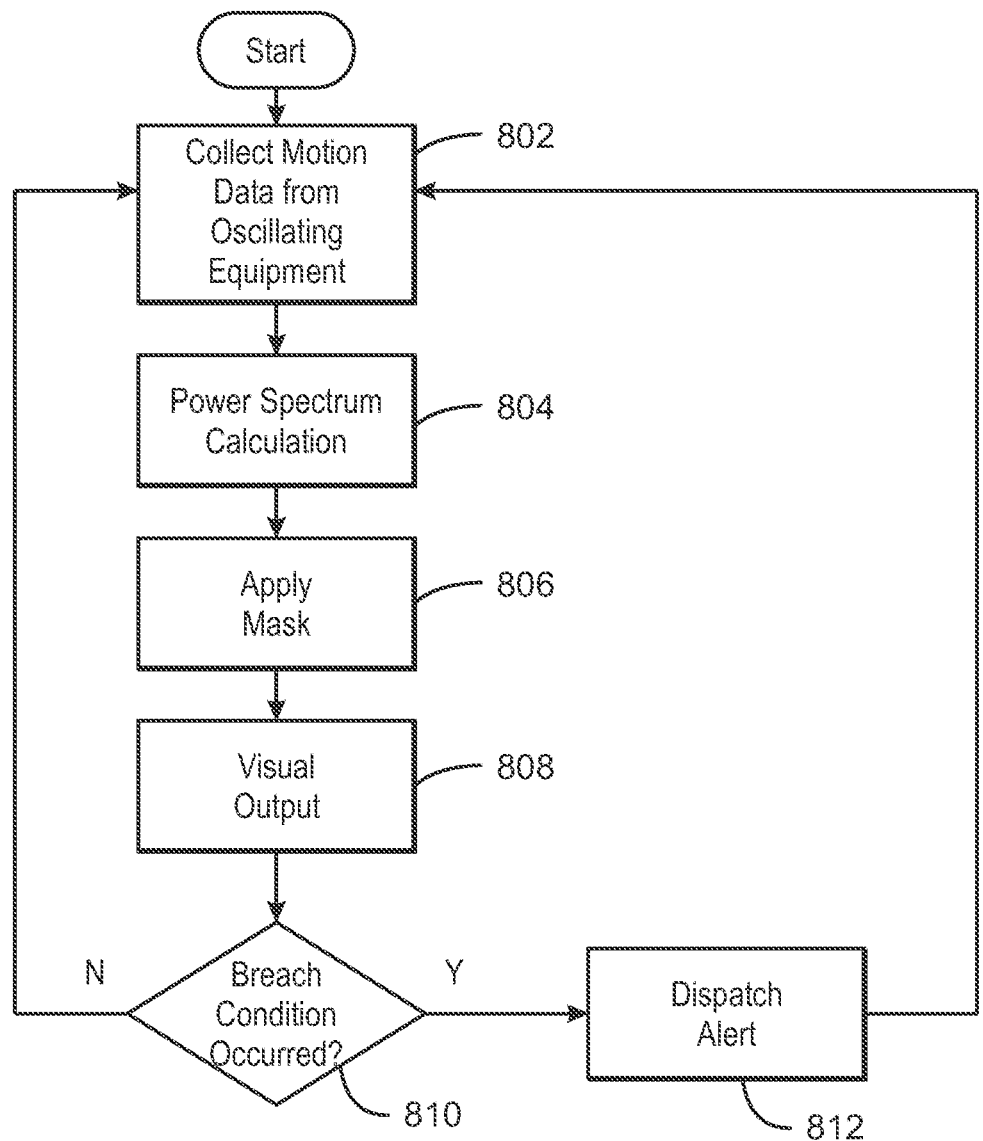
FIG. 8 is a block diagram of a method for tracking the motion of oscillating mechanical devices to identify faults.

FIG. 8 is a block diagram of a method 800 for tracking the motion of oscillating mechanical devices to identify faults. The method may be implemented by the IoT devices described with respect to FIGS. 1 and 2. The method 800 may be used for rotating equipment, as described with respect to the pumpjacks of FIGS. 3-7. Further, the method may be used to track motion for other types of oscillating mechanical devices, such as linear motion along an axis.

The method starts at block 802, with an IoT device collecting motion data for an oscillating mechanical device. This may be performed, for example, by attaching an IoT device with an accelerometer to a moving part of the oscillating mechanical device, and transmitting the motion to a backend processing system.

At block 804, a power spectrum is calculated for the oscillating mechanical device. For example, this may be performed by determining in-phase and quadrature vectors for the mechanical device, transforming the vector field into the frequency domain, then calculating the power spectrum as the absolute value of the data in the frequency domain. Further, the data from a number of oscillating mechanical devices may be combined to form a single data set or single power spectrum, for example, for an oil field, allowing a fast identification of problems with any one device.

At block 806, a mask is applied over the power spectrum to determine if a device is having operation difficulties. As described with respect to FIG. 6, the mask may be a simple window that indicates if any single unit is not functioning. In other examples, the mask may be more complex, for example, including multiple windows that may be used to indicate if a frequency of an oscillation of a mechanical device has changed. This may be used to determine if a pump has broken, are if other faults are present. The mask may also include more complex mathematical analyses, such as comparing the power spectrum of upstrokes and downstrokes to determine if pumping efficiency has changed.

At block 808, a visual output of the analysis is generated. The visual output may include a plot of a power spectrum with the mask, as shown in FIG. 6, displayed on a control room monitor. In some examples, the visual output may be simpler, such as an indication of the operations of a number of oscillating mechanical devices on a display located in a field.

At block 810, a determination is made as to whether any devices are outside of functional limits, for example, based on the comparison to the mask. If so, process flow proceeds to block 812 to dispatch an alert, for example, to operators of the field. In some examples, the alert may be a visual indicator, such as an indication of an oscillating mechanical device having functional issues on a display in a control room, a display located in a field, or a flashing light on a device having operational problems. In addition to, or instead of, visual alerts, the alert may include audible alerts, such as an alarm tone in a control room, or a sound generator on an IoT device associated with the oscillating mechanical device. Further, the alert may also include a system to automatically shut the oscillating mechanical device down if the analysis indicates that further operation may result in damage to the oscillating mechanical device, a well, or the like.

Process flow then returns to block 802 to continue monitoring the oscillating mechanical device. Any alerts sounded may be automatically cleared, for example, if the device returns to normal operations on a future cycle, or may be manually cleared, for example, in the case of a serious deviation from operating parameters.

Figure 9:
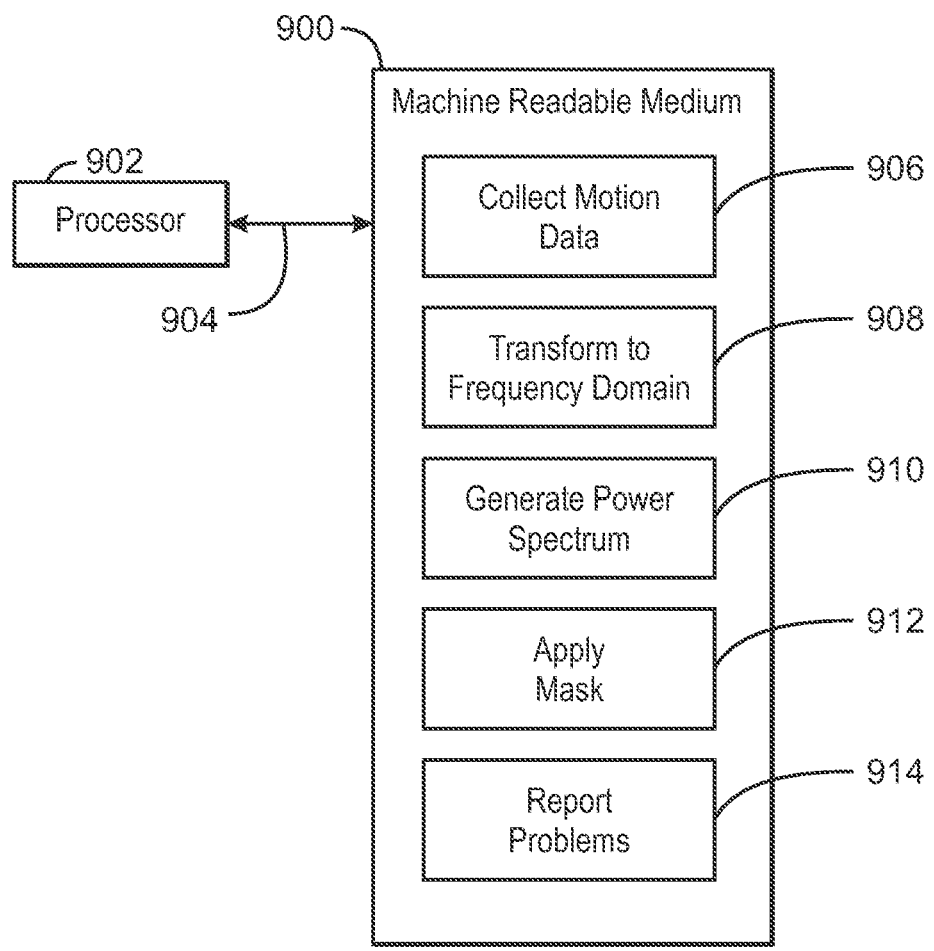
FIG. 9 is a block diagram of a non-transitory, computer readable medium that includes instructions to direct a processor to monitor an oscillating mechanical device.

FIG. 9 is a block diagram of a non-transitory, computer readable medium 900 that includes instructions to direct one or more processors 902 to monitor an oscillating mechanical device. The non-transitory, computer readable medium 900 may be by the processor 902 over a bus 904 that may include a proprietary bus in an SoC, a SPI bus, or any numbers of other bus technologies, as described with respect to FIG. 2. The non-transitory, computer readable medium 900 may include, for example, any type of read only memory (ROM), any type of solid state drive (SSD), any type of random access memory (RAM), and the like.

The non-transitory, computer readable medium 900 may include instructions 906 to direct the one or more processors 902 to collect motion data from an oscillating mechanical device. Instructions 908 may be included to direct the one or more processors 902 to transform the motion data to the frequency domain. Other instructions 910 may be included to generate a power spectrum from the data in the frequency domain. Instructions 912 may be included to apply a mask to the power spectrum to determine if an oscillating mechanical device is having operational difficulties. Another block of instructions 914 may be included to report any problems identified with a mechanical device.

The instructions are not limited to those shown in FIG. 9, but may include other instructions, such as to display the power spectrum, or alerts on a monitor proximate to the device, in a control room, or both. Other instructions may be included to activate a visual alarm signal on the device, an audible alarm signal on the device, or shut down the device to prevent damage.

Example 1 includes an apparatus for monitoring an oscillating mechanical device. The apparatus includes an Internet of Things (IoT) device that includes a movement measurer to obtain movement data from an accelerometer attached to the oscillating mechanical device, and a transform calculator to generate a power spectrum from the movement data.

Example 2 includes the subject matter of example 1. In this example, the apparatus includes an analyzer to alert if the power spectrum is outside of a mask.

Example 3 includes the subject matter of either of examples 1 or 2. In this example, the apparatus includes a pumpjack with the accelerometer mounted to the pumpjack.

Example 4 includes the subject matter of any one of examples 1 to 3. In this example, the apparatus includes: a plurality of oscillating mechanical devices each including an IoT device including an accelerometer and a backend processing system to accept data from each of the IoT devices, wherein a power spectrum for each of the plurality of oscillating mechanical devices is combined into a single plot. An analyzer applies an alert mask to the single plot to determine if any of the plurality of oscillating mechanical devices is having operational problems.

Example 5 includes the subject matter of any one of examples 1 to 4. In this example, the apparatus includes a display to show the power spectrum.

Example 6 includes the subject matter of any one of examples 1 to 5. In this example, the apparatus includes an alert system including a visual alert, an electronic alert, and audible alert, or combination thereof.

Example 7 includes the subject matter of any one of examples 1 to 6. In this example, the apparatus includes a reporter to report the power spectrum to a server through a communications device.

Example 8 includes a method for monitoring an oscillating mechanical device using an internet of things (IoT) device. The method includes collecting motion data from an accelerometer attached to a moving part in the oscillating mechanical device, calculating a power spectrum for the oscillating mechanical device from the motion data, and applying a mask over the power spectrum to determine if a device is having operation difficulties.

Example 9 includes the subject matter of example 8. In this example, the method includes collecting motion data from a plurality of accelerometers, each attached to a separate oscillating mechanical device and calculating the power spectrum for each of the separate oscillating mechanical devices from the motion data collected for the separate oscillating mechanical device. The data is combined to form a single data set and the mask is applied to the single data set to determine if any of the separate oscillating mechanical devices is having operational difficulties.

Example 10 includes the subject matter of either of examples 8 or 9. In this example, the method includes calculating in-phase and quadrature (I/Q) vectors from the motion data.

Example 11 includes the subject matter of any one of examples 8 to 10. In this example, the method includes converting the I/Q vectors to frequency domain data.

Example 12 includes the subject matter of any one of examples 8 to 11. In this example, the method includes calculating the power spectrum from the frequency domain data.

Example 13 includes the subject matter of any one of examples 8 to 12. In this example, the method includes displaying the power spectrum on a monitor in a control room or a local monitoring point.

Example 14 includes the subject matter of any one of examples 8 to 13. In this example, the method includes activating an alert if any of the separate oscillating mechanical devices is having operational difficulties.

Example 15 includes the subject matter of any one of examples 8 to 14. In this example, the method includes shutting off power to an oscillating mechanical device based, at least in part, on readings from an IoT device measuring the motion of the oscillating mechanical device.

Example 16 includes the subject matter of any one of examples 8 to 15. In this example, the method includes comparing a power spectrum for upstrokes to a power spectrum for downstrokes of a pumpjack to determine if pumping efficiency has changed.

Example 17 includes a non-transitory machine-readable medium including instructions, which when executed by one or more processors, cause the one or more processors to perform any of the methods of examples 8 to 16.

Example 18 includes an apparatus comprising means for performing any of the methods of examples 8 to 16.

Example 19 includes a non-transitory, computer readable medium including instructions to direct one or more processor to collect motion data from an accelerometer on movement of an oscillating mechanical device, generate a power spectrum of the motion data, and report problems identified from the power spectrum.

Example 20 includes the subject matter of example 19. In this example, the non-transitory, computer readable medium includes instructions to direct one or more processor to convert the motion data to vector data, transform the vector data to frequency domain data, and generate the power spectrum from the frequency domain data.

Example 21 includes the subject matter of either of examples 19 or 20. In this example, the non-transitory, computer readable medium includes instructions to direct one or more processor to apply a mask to the power spectrum to identify operational problems in the oscillating mechanical device.

Example 22 includes the subject matter of any one of examples 19 to 21. In this example, the non-transitory, computer readable medium includes instructions to direct one or more processor to generate a visual or numerical output of the power spectrum.

Example 23 includes an internet of things (IoT) device for monitoring movement of an oscillating mechanical device. The IoT device includes a movement measurer to obtain movement data from a sensor attached to the oscillating mechanical device, wherein the sensor is an accelerometer.

Example 24 includes the subject matter of example 23. In this example, the IoT device includes a radio transceiver to send the movement data to a backend processing system Example 25 includes the subject matter of either of examples 23 or 24. In this example, the IoT device includes a transform calculator to generate a power spectrum from the movement data, an analyzer to generate an alert if the power spectrum is outside of a mask, and a reporter to send the alert to a server.

Example 26 includes the subject matter of any one of examples 23 to 25, wherein the transform calculator includes a frequency domain calculator to convert vector data into frequency domain data and a power spectrum calculator to calculate the power spectrum from the frequency domain data.

Example 27 includes the subject matter of any one of examples 23 to 26. In this example, the IoT device includes an actuator, wherein the actuator includes a visual alert system, an audible alert system, or a power switch for the oscillating mechanical device, or any combinations thereof.

Example 28 includes an apparatus for monitoring an oscillating mechanical device, including an Internet of Things (IoT) device. The IoT device includes a means to obtain movement data from an oscillating mechanical device and a transform calculator to generate a power spectrum from the movement data.

Example 29 includes the subject matter of example 28. In this example, the apparatus includes a means to alert if the power spectrum is outside of a mask.

Example 30 includes the subject matter of either of examples 28 or 29. In this example, the apparatus includes a plurality of oscillating mechanical devices, each including an IoT device including an accelerometer, a means for creating a combined power spectrum plot for the plurality of oscillating mechanical devices, and an analyzer to apply an alert mask to the single plot to determine if any of the plurality of oscillating mechanical devices is having operational problems.

Example 31 includes the subject matter of any one of examples 28 to 30. In this example, the apparatus includes a means for displaying the power spectrum.

Example 32 includes the subject matter of any one of examples 28 to 31. In this example, the apparatus includes a means for alerting a user.

Example 33 includes the subject matter of any one of examples 28 to 32. In this example, the apparatus includes a means for reporting the power spectrum.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for monitoring a plurality of oscillating mechanical devices, comprising:
   a plurality of Internet of Things (IoT) devices, each IoT device corresponding to a respective one of the plurality of oscillating mechanical devices, the IoT devices each comprising:
   an accelerometer attached to the respective oscillating mechanical device;
   a movement measurer to obtain movement data from the accelerometer attached to the respective oscillating mechanical device;
   a transform calculator to generate a power spectrum from the movement data;
   a comparator to compare a power spectrum for upstrokes to a power spectrum for downstrokes to determine if pumping efficiency has changed; and
   a backend processing system to accept data from each of the IoT devices, wherein a power spectrum for each of the plurality of oscillating mechanical devices is combined into a single plot, and the backend processing system comprises an analyzer to apply an alert mask to the single plot to determine if any of the plurality of oscillating mechanical devices is having operational problems.

2. The apparatus of claim 1, comprising a pumpjack with the accelerometer mounted to the pumpjack.

3. The apparatus of claim 2, wherein the accelerometer is mounted to a counterweight of the pumpjack.

4. The apparatus of claim 1, comprising a display to show the power spectrum.

5. The apparatus of claim 1, comprising an alert system comprising a visual alert, an electronic alert, and audible alert, or combination thereof.

6. The apparatus of claim 1, comprising a reporter to report the power spectrum to a server through a communications device.

7. The apparatus of claim 1, comprising a calculator to calculate in-phase and quadrature (I/Q) vectors from the motion data.

8. The apparatus of claim 7, comprising a converter to convert the I/Q vectors to frequency domain data.

9. The apparatus of claim 1, each of the IoT devices to convert rotational movement of the mechanical oscillating device into coordinate data points.

10. The apparatus of claim 1, the backend processing system to perform frequency analysis to determine a pumping rate, upstroke loadings, downstroke loadings, pumping rate variations across the mechanical oscillating devices, and to identify idle mechanical oscillating devices.

11. An internet of things (IoT) device for monitoring movement of an oscillating mechanical device, comprising:
    an accelerometer attached to the oscillating mechanical device;
    a movement measurer to obtain movement data from the accelerometer attached to the oscillating mechanical device;
    a transform calculator to generate a power spectrum from the movement data;
    an analyzer to generate an alert if the power spectrum is outside of a mask;
    a radio transceiver to transmit the alert; and
    a comparator to compare a power spectrum for upstrokes to a power spectrum for downstrokes to determine if pumping efficiency has changed.

12. The IoT device of claim 11, the radio transceiver to send the movement data to a backend processing system.

13. The IoT device of claim 11, wherein the transform calculator comprises:
    a frequency domain calculator to convert vector data into frequency domain data; and
    a power spectrum calculator to calculate the power spectrum from the frequency domain data.

14. The IoT device of claim 11, the oscillating mechanical device comprising a pumpjack, with the accelerometer mounted to the pumpjack.

15. The IoT device of claim 11, the oscillating mechanical device comprising a pumpjack, with the accelerometer mounted to a counterweight of the pumpjack.

16. The IoT device of claim 11, comprising a calculator to calculate in-phase and quadrature (I/Q) vectors from the motion data.

17. The IoT device of claim 16, comprising a converter to convert the I/Q vectors to frequency domain data.

18. The IoT device of claim 11, the IoT device to convert rotational movement of the mechanical oscillating device into coordinate data points.

19. An apparatus for monitoring a plurality of oscillating mechanical devices, comprising:
    a plurality of Internet of Things (IoT) devices, each IoT device corresponding to a respective one of the plurality of oscillating mechanical devices, the IoT devices each comprising:
    an accelerometer attached to the respective oscillating mechanical device;
    a movement measurer to obtain movement data from the accelerometer attached to the respective oscillating mechanical device;
    a transform calculator to generate a power spectrum from the movement data; and
    a backend processing system to accept data from each of the IoT devices, wherein a power spectrum for each of the plurality of oscillating mechanical devices is combined into a single plot, and the backend processing system comprises an analyzer to apply an alert mask to the single plot to determine if any of the plurality of oscillating mechanical devices is having operational problems, the backend processing system to perform frequency analysis to determine a pumping rate, upstroke loadings, downstroke loadings, pumping rate variations across the mechanical oscillating devices, and to identify idle mechanical oscillating devices.

20. The apparatus of claim 19, comprising a calculator to calculate in-phase and quadrature (I/Q) vectors from the motion data.

21. The apparatus of claim 19, each of the IoT devices to convert rotational movement of the mechanical oscillating device into coordinate data points.

* * * * *